US006960277B2

(12) United States Patent
Brunet

(10) Patent No.: US 6,960,277 B2
(45) Date of Patent: Nov. 1, 2005

(54) LAMINATED CROSS LUMBER AND METHOD OF MAKING SAME

(75) Inventor: Alain Brunet, Dolbeau (CA)

(73) Assignee: Pinexel Inc., Dolbeau-Mistassini (CA)

( * ) Notice: Subject to any disclaimer, the term of this patent is extended or adjusted under 35 U.S.C. 154(b) by 0 days.

(21) Appl. No.: 10/650,784

(22) Filed: Aug. 29, 2003

(65) Prior Publication Data

US 2005/0045270 A1 Mar. 3, 2005

(51) Int. Cl.[7] .......................... B32B 31/00; B27M 1/00

(52) U.S. Cl. ................... 156/264; 156/304.5; 144/347; 144/351; 144/354

(58) Field of Search ............................. 156/264, 304.5, 156/263; 144/344, 345, 346, 347, 348, 350, 144/351, 352, 354

(56) References Cited

U.S. PATENT DOCUMENTS

| | | | | |
|---|---|---|---|---|
| 1,594,889 A | * | 8/1926 | Loetscher | 144/351 |
| 3,041,231 A | * | 6/1962 | Fountain | 156/254 |
| 4,568,577 A | | 2/1986 | Fischetti | |
| 5,015,320 A | * | 5/1991 | Abendroth et al. | 156/264 |
| 5,462,623 A | * | 10/1995 | Day | 156/250 |
| 5,618,371 A | * | 4/1997 | Sing | 156/264 |
| 5,881,786 A | * | 3/1999 | Wilderman et al. | 144/348 |
| 6,446,412 B2 | | 9/2002 | Mathis | |
| 2003/0010434 A1 | | 1/2003 | Grenier | |

FOREIGN PATENT DOCUMENTS

| | | |
|---|---|---|
| CA | 2328338 | 12/2000 |
| CA | 2350380 | 6/2002 |
| WO | WO 98/12030 | 3/1998 |

* cited by examiner

*Primary Examiner*—Linda Gray
(74) *Attorney, Agent, or Firm*—Ogilvy Renault LLP

(57) ABSTRACT

A method for making a laminated cross lumber beam comprising the step of stacking elongated wood members and bonding adjacent longitudinal faces thereof along a bonding plane to form intermediary beams. The method further includes a step of selecting intermediary beams having a width greater than a predetermined value and cutting them lengthwise perpendicularly to the bonding planes such as to form panels. The panels and uncut intermediary beams then form sub-beam elements. The method also includes a step of bonding at least two sub-beam elements together side by side to form the laminated cross lumber beam. This method is simplified by the use of small wood members which eliminates the need to cut the intermediary beam to form the sub-beam element. It requires a minimum of steps, thus minimizing costs. The product of this method is a beam with optimized mechanical properties and visual appearance.

28 Claims, 3 Drawing Sheets

LAMINATED CROSS LUMBER AND METHOD OF MAKING SAME

BACKGROUND OF THE INVENTION

1. Field of the Invention

The present invention relates to static wood structures. More particularly, the present invention relates to a method for making a laminated wood product.

2. Background Art

A variety of laminated wood beams are used in construction work today as joists, girders, posts, columns or other structural pieces. Laminated wood beams are known to be stronger, more resistant and more dimensionally stable than continuous wood beams. Unfortunately, the fabrication of traditional laminated beams requires the use of wood members of dimensions and quality that have become increasingly harder to obtain due to the fact that nowadays the trees available are a lot smaller than they once were. Thus, the wood members are often cut from trees of relatively small diameter, such as trees from plantation or northern forests, thereby producing members of low grade, small dimensions and with a high proportion of flash.

Also, the cutting of wood for various elements required in construction work generates a great quantity of pieces of small dimensions, difficult to reuse thus usually considered as waste. This high proportion of wasted material greatly increases fabrication costs.

Accordingly, a number of alternative laminated wood products methods have been developed in order to be able to use smaller wood members and/or wood members of lower grade. One example of such a product is presented in U.S. Pat. No. 4,568,577 issued Feb. 4, 1996 to Fischetti, where squared timbers of uniform thickness are joined edge to edge and end to end in order to form a laminated structure with at least one longitudinal void. While this configuration allows for the recycling of timbers of small length by joining them end to end through a pencil joint, it does not allow the use of timbers of varying thicknesses. Moreover, defects such as flash must be removed before assembling the timbers, thereby reducing the proportion of waste material that can be reused.

A number of alternative methods gave also been developed to produce laminated wood products. U.S. Pat. No. 6,446,412 issued Sep. 10, 2002 to Mathis presents a method of making glulam wood beams using strips of planks of identical thickness glued side to side. Careful planning in the placement of the planks of various widths is needed to avoid aligned joints in the beam causing beam weakness. If the joints between planks are aligned, a strip can be cut from the beam perpendicularly to the original strips and then attached thereto to reinforce the beam. However, this additional strip greatly increases the time and costs of manufacturing by augmenting the number of steps in the process.

CA Patent Application No. 2,350,380 filed Jun. 13, 2001 by Grenier presents a method for making a lamellated wood product of high mechanical properties from wood slats of uniform thickness. The wood slats are bonded end to end to a desired length and edge bonded into a panel, the panel is cut into smaller panels of identical width, the small panels are face bonded to form a beam, the beam is cut to form smaller beams, and the small beams are cut into lamellated wood product. This process requires numerous steps in order to obtain the final product. Moreover, the requirement of uniform thickness prevents the use of slats containing defects such as flash.

Accordingly, there is a need for a method of making laminated wood beams that requires a minimum of steps, while easily integrating the use of potential waste material such as small wood members of non standard dimensions and wood members containing flash.

SUMMARY OF INVENTION

It is therefore an aim of the present invention to provide a method for making a laminated cross lumber beam that is simple.

It is another aim of the present invention to provide a method for making a laminated cross lumber beam that can be further simplified by the use of small wood members.

It yet another aim of the present invention to provide a method for making a laminated cross lumber beam that easily integrates the use of wood members containing flash.

It is an additional aim of the present invention to provide a method for making a laminated cross lumber beam that easily integrates the use of wood members of non standard dimensions.

It is a further aim of the present invention to provide a method for making a laminated cross lumber beam that produces a beam of superior mechanical properties and pleasing visual appearance.

Therefore, in accordance with the present invention, there is provided a method for making a laminated cross lumber beam comprising the steps of:

a) Providing a plurality of elongated wood members, each having a top longitudinal face and a bottom longitudinal face extending between a pair of opposed longitudinal sides;

b) Stacking a plurality of elongated wood members with the top and bottom longitudinal faces of adjacent stacked elongated wood members bonded to one another along a bonding plane such as to form a number of intermediary beams of similar height generally corresponding to a desired height of the laminated cross lumber beam to be made;

c) Cutting each intermediary beam having a width greater than a predetermined value along a lengthwise plane generally perpendicular to the bonding planes thereof such as to form a plurality of panels, the panels and uncut intermediary beams forming sub-beam elements having opposed longitudinal sides generally perpendicular to the bonding planes thereof;

d) Joining at least two sub-beam elements together with opposed facing longitudinal sides of adjacent sub-beam elements bonded to one another to form the laminated cross lumber beam.

Further in accordance with the present invention, there is provided a method for making a laminated wood timber from a plurality of elongated wood members, comprising the steps of:

a) Using the wood members to make at least two laminated beams having a width corresponding generally to a width of the elongated wood members, wherein a plurality of the wood members are joined together face to face along joining planes to form each of the laminated beams;

b) Cutting lengthwise the laminated beams having a width greater than a predetermined value into panels, the panels and uncut laminated beams forming sub-timber elements, each sub-timber element having longitudinal sides generally perpendicular to the joining planes thereof;

c) joining at least two sub-timber elements side by side to form a laminated wood timber.

BRIEF DESCRIPTION OF THE DRAWINGS

Having thus generally described the nature of the invention, reference will now be made to the accompanying drawings, showing by way of illustration a preferred embodiment thereof and in which.

DESCRIPTION OF THE PREFERRED EMBODIMENTS

Figure 1:
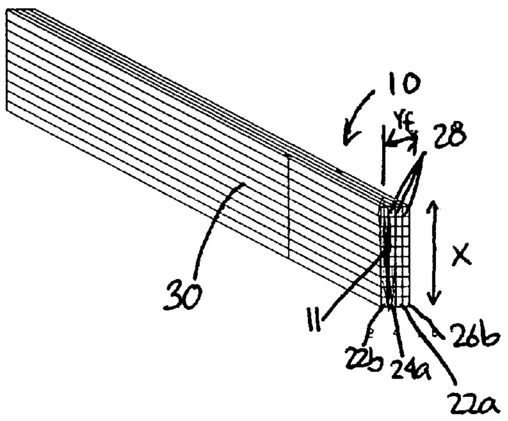
FIG. 1 is a perspective view of a laminated cross lumber beam according to a preferred embodiment of the present invention.

Referring now to FIG. 1, a laminated cross lumber beam or timber 10 is composed of a plurality of elongated wood pieces 11 bonded together face to face and side to side. This laminated cross lumber beam 10 presents the advantages of superior mechanical and physical properties and a visual aspect similar to a standard laminated beam, while being produced using a simple method that can be further simplified by the use of small wood members as a starting material. The simplicity of the process minimizes fabrication costs. The method used to produce this laminated cross lumber beam is described in the following.

Figures 2A, 2B, 2C:
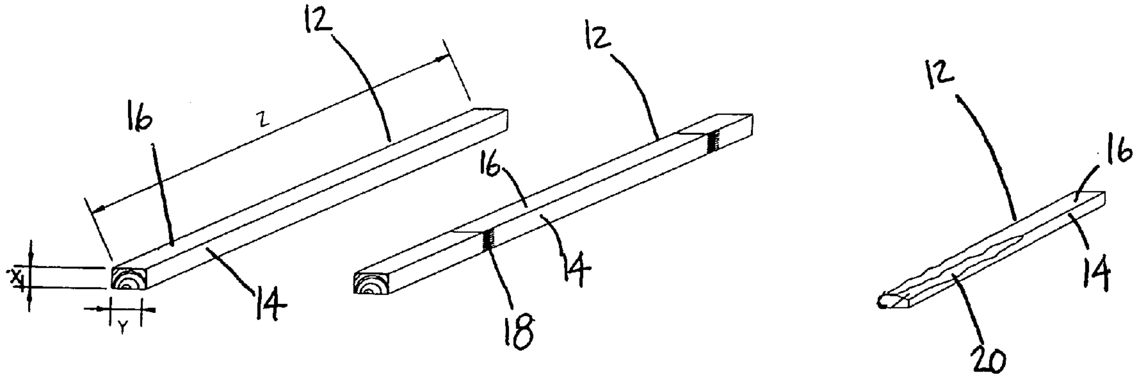
FIG. 2A to 2C are perspective views of wood members used as starting material in the method according to a preferred embodiment of the present invention.

The starting material for the method according to the present invention is a plurality of elongated wood members 12. The wood members 12 include two longitudinal sides 14 and top and bottom wider longitudinal faces 16. Shown in FIG. 2 are different examples of wood members 12 that can be used: integral members (FIG. 2A), smaller members joined end to end through finger joints 18 or any other appropriate joints (FIG. 2B), and members partially composed of flash 20 (FIG. 2C). The wood members 12 are preferably made of high density softwood such as black spruce or jack pine of low grade (no. 3 and/or economy). Of course, other types and grades of wood can be used, as needed. The wood members also need to have an appropriate humidity content, for example between 12% and 15%. Preferred dimensions for the wood members are a thickness (X1) of 0.75 to 2 inches, a width (Y) of 1.5 to 8 inches and a length (Z) of 6 inches to 20 feet, but of course any other appropriate dimensions can be used.

An optional preliminary step of evening the dimensions of the wood members 12 can be performed, for example by planing. This can be done to eliminate all or part of the variations in width and/or thickness within the wood members 12, thereby optimizing the adhesion between adjacent wood members 12 by increasing the surface of contact therebetween. This step also allows the removal of at least part of the flash 20 if so desired. The wood members 12 are selected and/or transformed so as to obtain groups of wood members 12 of similar width (Y).

Figure 3:
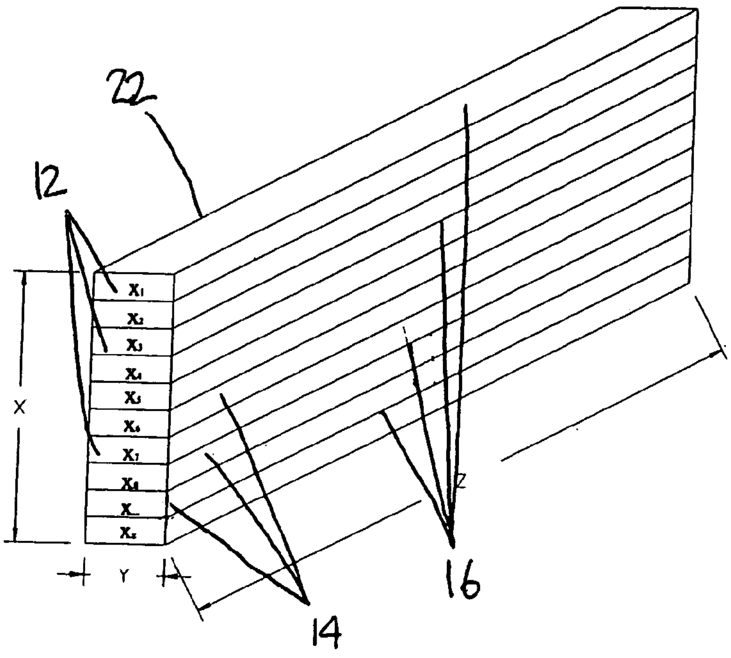
FIG. 3 is a perspective view of a beam obtained by the face to face lamination of the wood members.

Glue is then put on the longitudinal faces 16 of the wood members 12 of similar width (Y) before pressing them together face to face in order to form a beam 22 as shown in FIG. 3. For a product required to perform according to mechanical criteria, the glue used is preferably a structural wood glue such as polyurethane (PUR), isocyanates, phenol-resorcinol-formaldehyde (PRF), resorcinol or any other appropriate adhesive. For a product required to perform according to chemical criteria, a non-structural wood glue can be used, such as polyvinyl acetate (PVA), urea melamine (UM), urea formaldehyde (UF), or any other appropriate adhesive. The thickness (X) of the beam 22 is the sum of the thicknesses (X1) of the wood members 12 used, whereas the width (Y) of the beam 22 is determined by the width of the widest wood member 12 used.

If required, a step of planing the beam 22 can then be performed in order to obtain a more uniform width (Y). This can be done, for example, by longitudinally running the beam 22 through an edging station. This step also allows for removal of at least part of the flash 20 if so desired.

Figure 4:
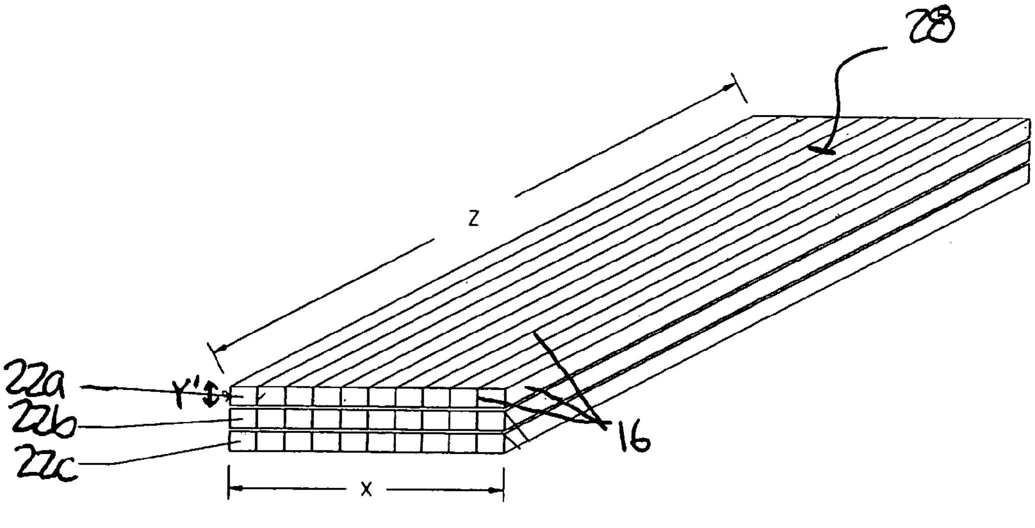
FIG. 4 is a perspective view showing the step of cutting the beam shown in FIG. 3.

The beam 22 is then cut perpendicularly to the longitudinal faces 16 of the wood members 12 as shown in FIG. 4. This will produce a number of panels 22*a,b,c* having a smaller width (Y') that can be, for example, between 0.5 and 4 inches. For beams 22 that have a small enough width (for example, 2 inches or less), this step can be omitted. Thus, the method of the invention can be simplified when the starting material is smaller.

Figure 5:
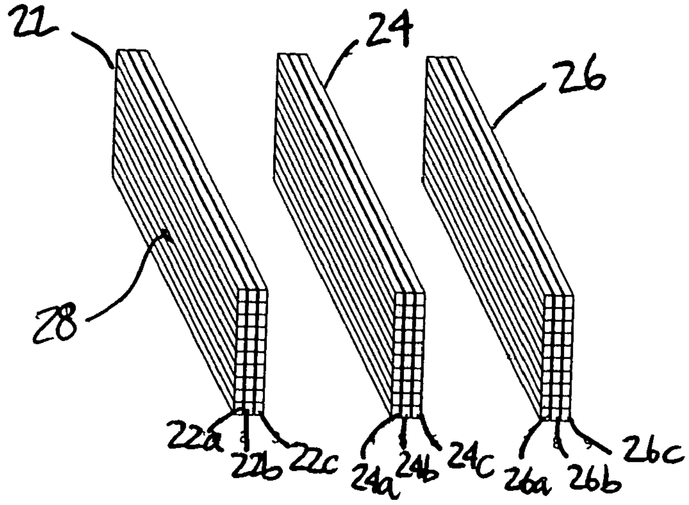
FIG. 5 is a perspective view of panels produced by the cutting operation illustrated in FIG. 4.

Some of the panels 22*a,b,c*, 24*a,b,c*, 26*a,b,c* are then pressed and glued together along faces 28 parallel to the longitudinal sides of the wood members 12 to produce the laminated cross lumber beam 10, as shown in FIG. 1. The adhesive used can be the same as previously used or another appropriate adhesive. The width (Yf) of the laminated cross lumber beam 10 is the sum of the widths (Y') of the panels used, whereas the height (X) of the laminated cross lumber beam 10 is determined by sum of the thicknesses (X1) of the wood members 12 used. Of course, small beams that have not been cut into panels are assembled in a similar manner, and can be used alone or in combination with panels to form a laminated cross lumber beam 10. In a preferred embodiment, the panels are selected so that adjacent panels come from different beams (see FIG. 5 in conjunction with FIG. 1). In the example shown, a panel 24*a* from beam 24 is sandwiched between panels 22*b* and 22*a* from beam 22, panel 22*a* being also adjacent to a panel 26*b* from beam 26. This distribution favors the discontinuity of wood fibers between the panels and optimizes the distribution of weakness points within the laminated cross lumber beam 10. Thus, a better distribution of internal forces can be achieved, causing a low variability in mechanical properties between different laminated cross lumber beams 10. Selecting the panels also allows to place panels with a better visual appearance to form the exterior surfaces 30, thereby improving the esthetic qualities of the laminated cross lumber beam 10.

Figure 6:
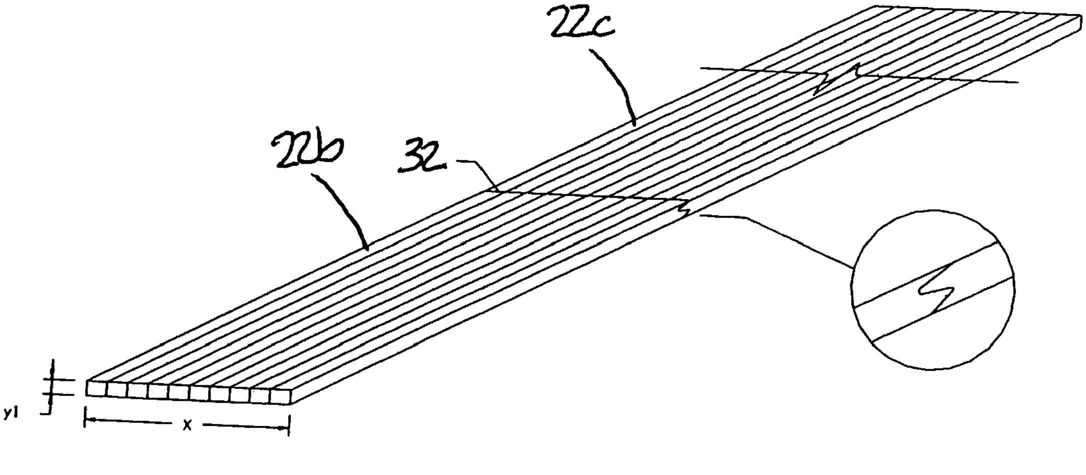
FIG. 6 is a perspective view illustrating the step of joining two panels to provide for the fabrication of beams of greater length.

To produce longer laminated cross section beams 10, the panels (here 22*b* and 22*c*) can be joined end to end, as shown in FIG. 6. Preferably, the joint 32 is S-typed combined with an appropriate adhesive, but any other equivalent joint can be used. For structural reasons, it is preferable that joints are not aligned between assembled adjacent panels in the laminated cross section beam 10. Of course, it is also possible to join together entire sections of laminated cross section beam 10 as well, using any appropriate type of joint.

Finally, if required, a planing of surfaces of the laminated cross section beam is done so as to obtain the final desired dimensions.

The described method presents several advantages, one of which, as stated above, being the fact that the use of smaller starting material simplifies the fabrication process by allowing the omission of a step, namely the cutting of the beams into panels. Thus, this method allows for easy recuperation of scrap wood of small dimensions. This method also allows the use of other scrap wood, such as wood members of non standard dimensions and wood members containing flash, either as is or after removing it completely or partially. Moreover, this method allows for the positioning of the panel pieces in the laminated cross lumber beam in order to maximize mechanical properties and esthetic appearance. The laminated cross lumber beam has mechanical properties superior to the wood members composing it as well as a low variability of these properties between laminated cross lumber beams, namely because of wood fiber discontinuity and the distribution of weakness points brought by the cross lumber positioning of the panels. Finally, the laminated cross lumber beams produced by this method are produced rapidly in a minimum of steps, thus minimizing costs by diminishing handling, required equipment and workers, etc.

It will be appreciated that the invention is not limited to the specific embodiments described, which are merely illustrative. Modifications and variations will be readily apparent to those skilled in the art. Accordingly, the scope of the invention is deemed to be in accordance with the claims as set forth below.

I claim:

1. A method for making a laminated cross lumber beam comprising the steps of:

a) Providing a plurality of elongated wood members, each having a top longitudinal face and a bottom longitudinal face extending between a pair of opposed longitudinal sides, said top and bottom longitudinal faces being wider than said pair of opposed longitudinal sides, each of said elongated wood members having a width defined between said opposed longitudinal sides, and wherein each of said elongated wood members is of unitary jointless construction along the width thereof;

b) Stacking a plurality of elongated wood members with the top and bottom longitudinal faces of adjacent stacked elongated wood members bonded to one another along a bonding plane such as to form a number of intermediary beams of similar height generally corresponding to a desired height of the laminated cross lumber beam to be made;

c) Cutting any intermediary beam having a width greater than a predetermined value along a lengthwise plane generally perpendicular to the bonding planes thereof such as to form a plurality of panels, the panels and uncut intermediary beams forming sub-beam elements having opposed longitudinal sides generally perpendicular to the bonding planes thereof;

d) Joining at least two sub-beam elements together with the opposed facing longitudinal sides of adjacent sub-beam elements bonded to one another to form the laminated cross lumber beam.

2. A method for making a laminated cross lumber beam according to claim 1, wherein the elongated wood members are composed of softwood.

3. A method for making a laminated cross lumber beam according to claim 1, wherein at least one of the elongated wood members is partially composed of flask.

4. A method far making a laminated cross lumber beam according to claim 1, wherein at least one of the elongated wood members is composed of at least two wood pieces joined together end to end.

5. A method for making a laminated cross lumber beam according to claim 1, wherein before step b the method further comprises a step of planing the elongated wood members in order to maximize contact therebetween along the bonding planes.

6. A method for making a laminated cross lumber beam according to claim 1, further comprising a step of planing at least one of two surfaces defined by the sides of the superposed elongated wood members of at least one of the intermediary beams obtained in step b.

7. A method for making a laminated cross lumber beam according to claim 1, further comprising a step of planing at least one of the opposed sides of at least one of the sub-beam elements obtained in step c.

8. A method for making a laminated cross lumber beam according to claim 1, wherein step c further comprises adhering one of at least two panels and at least two intermediary beams end to end, thereby forming a sub-beam element having at leant a joint.

9. A method for making a laminated cross lumber beam according to claim 8, wherein the joint is an S joint.

10. A method for making a laminated cross lumber beam according to claim 8, wherein between steps c and d, the method further comprises a step of selecting the sub-beam elements to insure that the joint in the sub-beam element is sufficiently apart from similar joints in the adjacent sub-beam elements in the laminated cross lumber beam to avoid a weakening thereof.

11. A method for making a laminated cross lumber beam according to claim 1, wherein between steps c and d, the method further comprises a step of selecting the sub-beam elements to insure that adjacent sub-beam elements in the laminated cross lumber beam are from different intermediary beams.

12. A method for making a laminated cross lumber beam according to claim 1, wherein between steps c and d, the method further comprises a step of selecting the sub-beam elements to optimize a final visual appearance of the laminated cross lumber beam.

13. A method for making a laminated cross lumber beam according to claim 1, further comprising the step of:

e) Adhering at least two laminated cross lumber beams end to end in order to obtain a laminated cross lumber beam of a desired length.

14. A method for making a laminated cross lumber beam according to claim 1, further comprising the step of:

e) Planing at least one longitudinal surface of the laminated cross lumber beam in order to obtain desired final dimensions.

15. A method for making a laminated wood timber from a plurality of elongated wood members, each of the elongated wood members having a width extending between opposed outermost side edges, the elongated wood members being of unitary jointless construction along the width thereof, the method comprising the steps of:

a) Using the wood members to make at least two laminated beams having a width corresponding generally to a width of the elongated wood members, wherein a plurality of the wood members are joined together face to face along joining planes to form each of the laminated beams;

b) Cutting lengthwise any of the laminated beams having a width greater than a predetermined value into panels, the panels and uncut laminated beams forming sub-timber elements, each sub-timber element having longitudinal sides generally perpendicular to the joining planes thereof;

c) joining at least two sub-timber elements side by side to form a laminated wood timber, and wherein at least one of the elongated wood members is composed of at least two wood pieces joined together end to end.

16. A method for making a laminated wood timber according to claim 15, wherein the elongated wood members are composed of softwood.

17. A method for making a laminated wood timber according to claim 15, wherein at least one of the elongated wood members is partially composed of flash.

18. A method for making a laminated wood timber according to claim 15, wherein before step a the method further comprises a step of planing the elongated wood members in order to maximize contact therebetween along the joining planes.

19. A method for making a laminated wood timber according to claim 15, further comprising a step of planing at least one of two longitudinal surfaces extending perpendicularly to the joining planes of at least one of the laminated beams obtained in step a.

20. A method for making a wood laminated wood timber according to claim 15, further comprising a step of planing at least one of the longitudinal sides of at least one of the sub-timber elements obtained in step b.

21. A method for making a laminated wood timber according to claim 15, wherein step b further comprises adhering one of at least two panels and at least two laminated beams end to end, thereby forming a sub-timber element having at least a joint.

22. A method for making a laminated wood timber according to claim 21, wherein the joint is an S joint.

23. A method for making a laminated wood timber according to claim 21, wherein between steps b and c, the method further comprises a step of selecting the sub-timber elements to insure that the joint in the sub-timber element is sufficiently apart from similar joints in the adjacent sub-timber elements in the laminated wood timber to avoid a weakening thereof.

24. A method for making a laminated wood timber according to claim 15, wherein between steps b and c, the method further comprises a step of selecting the sub-timber elements to insure that adjacent sub-timber elements in the laminated wood timber are from different beams.

25. A method for making a laminated wood timber according to claim 15, wherein between steps b and c, the method further comprises a step of selecting the sub-timber elements to optimize a final visual appearance of the laminated wood timber.

26. A method for making a laminated wood timber according to claim 15, further comprising the step of:

d) Adhering at least two laminated wood timbers end to end in order to obtain a laminated wood timber of a desired length.

27. A method for making a laminated wood timber according to claim 15, further comprising the step of:

d) Planing at least one longitudinal surface of the laminated wood timber in order to obtain desired final dimensions.

28. A method for making a laminated wood timber from a plurality of elongated wood members, each of the elongated wood members having a width extending between opposed outermost side edges, the elongated wood members being of unitary jointless construction along the width thereof, the method comprising the steps of:

a) Using the wood members to make at least two laminated beams having a width corresponding generally to a width of the elongated wood members, wherein a plurality of the wood members are joined together face to face along joining planes to form each of the laminated beams;

b) Cutting lengthwise any of the laminated beams having a width greater than a predetermined value into panels, the panels and uncut laminated beams forming sub-timber elements, each sub-timber element having longitudinal sides generally perpendicular to the joining planes thereof;

c) joining at least two sub-timber elements side by side to form a laminated wood timber;

wherein step b further comprises adhering one of at least two panels and at least two laminated beams end to end, thereby forming a sub-timber element having at least a joint.

* * * * *